(12) United States Patent
Bardon et al.

(10) Patent No.: US 6,226,001 B1
(45) Date of Patent: May 1, 2001

(54) VIEWER INTERACTIVE OBJECT WITH MULTIPLE SELECTABLE FACE VIEWS IN VIRTUAL THREE-DIMENSIONAL WORKPLACE

(75) Inventors: Didier Daniel Claude Bardon, Austin; Richard Edmond Berry; Scott Harlan Isensee, both of Georgetown; John Martin Mullaly, Austin, all of TX (US); David John Roberts, Stockton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/813,848

(22) Filed: Mar. 7, 1997

(51) Int. Cl.$^7$ .................................................. G06T 17/00
(52) U.S. Cl. .......................................... 345/419; 345/427
(58) Field of Search .................................. 345/419, 428, 345/429, 433, 435, 427

(56) References Cited

U.S. PATENT DOCUMENTS

| | | | |
|---|---|---|---|
| 5,414,801 | * 5/1995 | Smith et al. | 345/419 |
| 5,604,848 | * 2/1997 | Harada et al. | 345/419 |
| 5,608,850 | * 3/1997 | Robertson | 345/427 |
| 5,689,628 | * 11/1997 | Robertson | 345/427 |
| 5,696,892 | * 12/1997 | Redmann et al. | 345/425 |
| 5,754,189 | * 5/1998 | Doi et al. | 345/473 |
| 5,767,855 | * 6/1998 | Bardon et al. | 345/355 |
| 5,808,613 | * 9/1998 | Marrin et al. | 345/355 |
| 5,848,399 | * 12/1998 | Burke | 705/27 |
| 5,900,879 | * 5/1999 | Berry et al. | 345/419 |
| 5,903,271 | * 5/1999 | Bardon et al. | 345/419 |
| 5,929,861 | * 7/1999 | Small | 345/427 |
| 5,973,697 | * 10/1999 | Berry et al. | 345/418 |

* cited by examiner

*Primary Examiner*—Cliff N. Vo
(74) *Attorney, Agent, or Firm*—J. B. Kraft; Volel Emile

(57) ABSTRACT

A system, method and computer program are provided for presenting to a viewer at a display interface, a virtual 3D workspace containing virtual 3D objects and viewer interactive means for navigating in said workspace. Each object in the workspace has a plurality of face views associated with it. Viewer interactive means are provided for selecting one of the face views. A predetermined face view is presented in the absence of a viewer selection.

8 Claims, 4 Drawing Sheets

VIEWER INTERACTIVE OBJECT WITH MULTIPLE SELECTABLE FACE VIEWS IN VIRTUAL THREE-DIMENSIONAL WORKPLACE

CROSS REFERENCE TO RELATED APPLICATIONS

The present application is related to the following applications which are copending: Ser. No. 08/813,891 and assigned to the same Assignee as the present application and claims a method and system for determining the best navigation path to a preferred face view of an object.

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., Computer Graphics Publication, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused. In order to stay focused, when the viewer addresses an object to which he is trying to relate, he must be presented with a view of that object which best suits the nature of the interaction with the object which he is approaching or addressing. For example, it should be understood that when the viewer is trying to interact with the object in order to appreciate or understand the objects aesthetic qualities, he may require a different view of the object than if he were approaching the object in order to make some changes in the object or input/output specific data in this object.

Copending application, Ser. No. 08/813,891, assigned to the common Assignee of the present application entitled "Viewer Interactive Object in Virtual Three-Dimensional Workspace, Didier D. C. Bardon et al. , provides a solution to this need by providing a display of virtual three-dimensional objects within a workspace together with viewpoint interface means for navigating within the workspace and further provides for means for storing along with each of a plurality of virtual objects which the viewer is to relate to a face view of the object. These views have predetermined angles with respect to the object. The face views are tailored to provide to the viewer a face view of the object best suited to the viewer's interactive purpose.

The above-referenced copending application, Ser. No. 08/813,891, permits a fixed predetermined face view to be stored with each object so as to be available irrespective of relocations of the associated object.

However, one fixed face for each object may not adequately serve the interactive viewer's or user's needs. The user will often need a variety of face views. Such face views may be presented at a variety of angles with respect to the object as well as at a variety of apparent distances for the object from the view point.

A particular face view may be displayed at predetermined apparent distances from the object. These apparent distances being determined by the nature and content of the face view. For example, if the face view is to be presented to the viewer for its aesthetic image content, e.g. a picture of an object, then the particular face view is presented to the viewer at some intermediate distance so that the viewer may appreciate the aesthetic qualities of the image without getting to close. On the other hand, if the face view to be presented to the interactive user is a face view within which the user is to read the material and to make selections, then the images which are presented to the viewer should be at an apparent close distance so that the user may read the textual material and make his choices.

The present invention provides for a data processor controlled display system for displaying a virtual three-dimensional workspace in which three-dimensional objects are represented by stored data which also includes associated data representative of a plurality of different face views for each object, each different face view is at a different predetermined angle with respect to the object.

Interactive user selection means are provided for the user to select one of said plurality of face views associated with each of said objects.

The present invention may be structural so that dependent on the direction of a pointer in the display or even the direction of the field of view with respect to the object or other selecting means provided to the interactive user, the system selects and displays the face view most appropriate to the interaction which the viewer wishes to have with the object. Simply stated, it is within the purview of the present invention to have an object with several sides. Each of the sides has views which are respectively appropriate for different kinds of user action; then, dependent on the above selection, one of a plurality of stored face views which is most appropriate for the user's intended interaction is presented on the display for that purpose.

In accordance with a more particular aspect of the present invention, as the viewer navigates through the virtual 3D workspace, a moveable viewpoint interface tracks the viewer's position. This interface is positionable at virtual distances with respect to the particular objects being addressed and the above-mentioned face view angles are relative to the positions of said interface.

The present invention is also applicable wherein the viewpoints are relative to groups or sets of objects and it is intended that the viewer be interactive with such sets of objects. In such a case, the stored face view would be relative to the object set and the predetermined face view angles would also be relative to the object set.

The predetermined face views are stored with respect to particular objects. Thus, even if the objects are moved within the virtual 3D space, the face views will remain the same unless the predetermined face views are changed and restored. It should be further understood that dependent on the viewer or user's needs, it may be desirable to change face views with respect to particular objects. In such a case, the system of the present invention comprehends the changing of the face view and then storing the new face view relative to the particular object.

DETAILED DESCRIPTION OF THE PREFERRED EMBODIMENT

Figure 1:
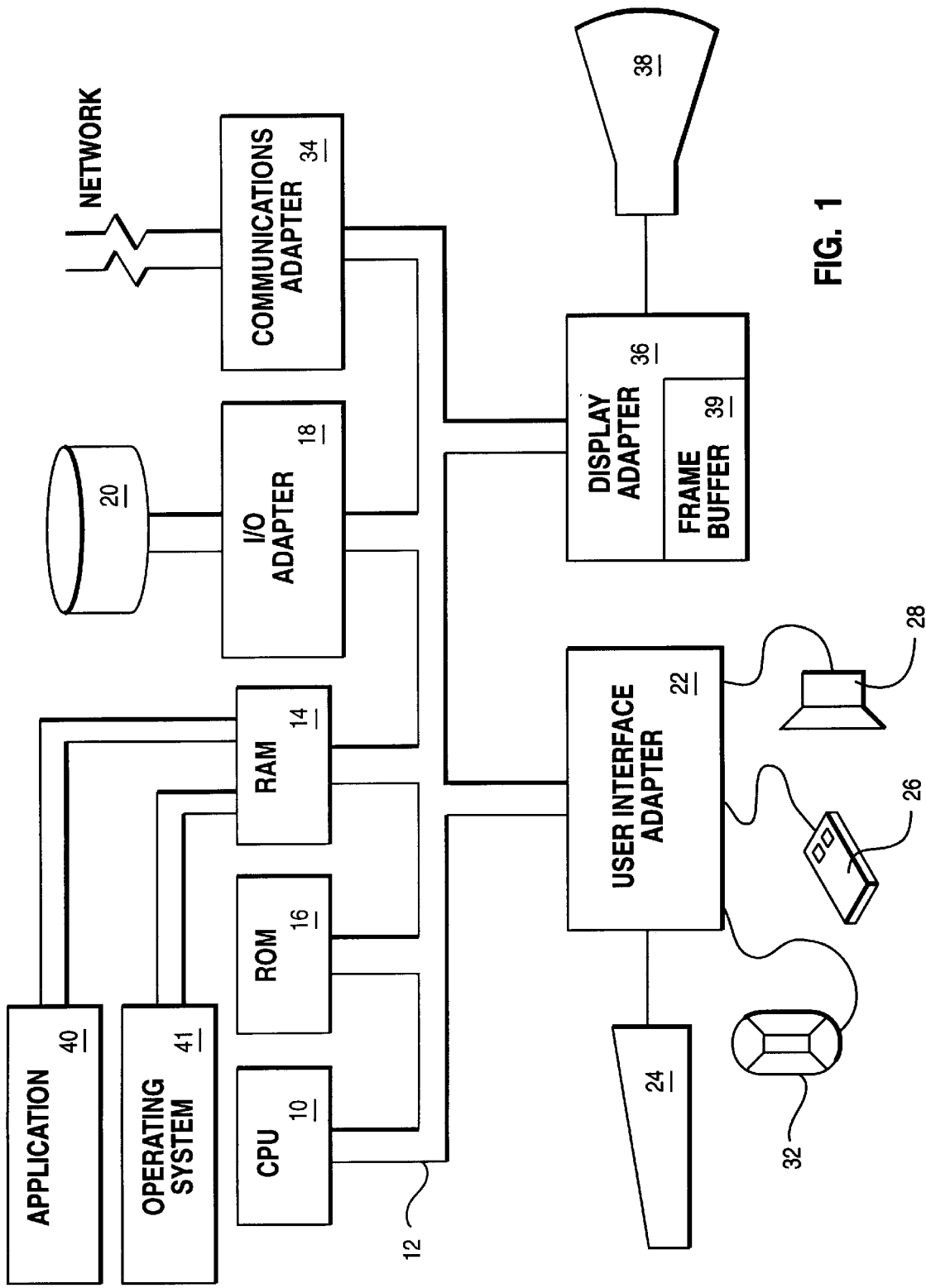
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in application 40.

Figure 2:
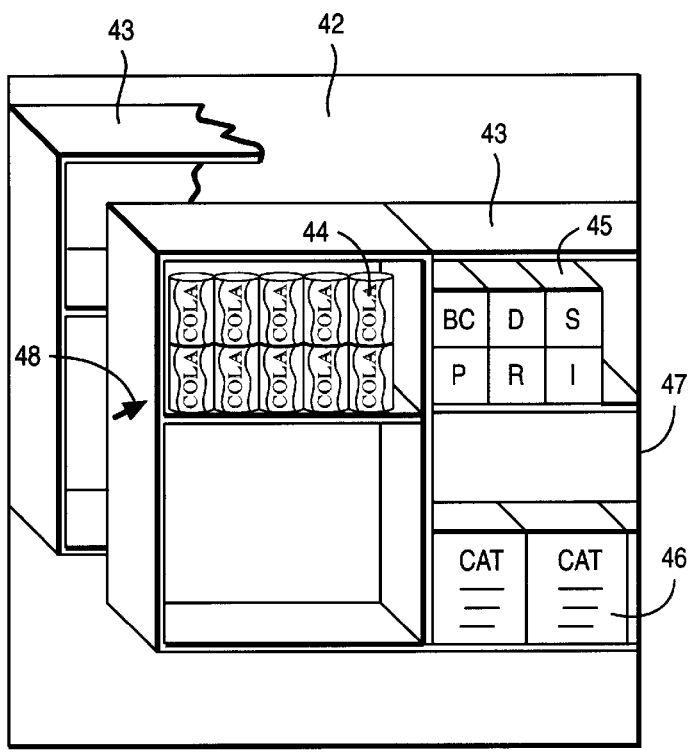
FIG. 2 shows a typical virtual reality work place in accordance with the present invention at a selected viewpoint.

The embodiment of the present invention will be described with respect to the diagrammatic virtual reality three-dimensional workspace shown in FIG. 2. The workspace 42 is shown as a three-dimensional image of a supermarket having racks of shelves 43 in which various products 44, 45 and 46 are stacked. The three-dimensional workspace which uses the supermarket metaphor. The viewer who is using the display for shopping purposes is presented with a viewpoint interface 47 which would be shown to the viewer on a display monitor such as monitor 38 of FIG. 1. In accordance with conventional techniques, the user may control the viewpoint 47 through conventional I/O such as mouse 26 of FIG. 1 which operates through user interface 22 to call upon the VRT programs in RAM 14 cooperating with the operating system 41 to create the images in frame buffer 39 of the display adapter 36 to control the display monitor 38. Using conventional virtual three-dimensional workspace navigation techniques, the viewpoint interface of the user shown in FIG. 2 is changeable as the user moves closer or backs away from objects in the workspace or moves to the right or left in the workspace. All this may be controlled by a suitable I/O device such as mouse 26 of FIG. 1.

The three-dimensional workspace 42 contains objects. Since the representation is one of a supermarket the objects are shelf racks 43, as well as the individual product items on the shelves such as stacked soda cans 44, soap bars 45 or cat food boxes 46. All of these items are comprehended by the user's field of view. The images for these various objects are stored as data from which the objects may be created on the display in RAM 14 of FIG. 1 in connection with the VRT program. Let us assume that a user is navigating through a three-dimensional workspace in which the viewpoint of FIG. 2 is a stage. Assuming that this interface is a virtual reality metaphor for helping a viewer make a selection of grocery items which are to be purchased, the system provides for the viewer selection of a particular one of the objects through a pointing device such as mouse 26 in FIG. 1. Let us say that the mouse controls a pointing device such as pointer 48 in FIG. 2. The above-referenced embodiment teaches that along with the respective images of objects such as those of objects 44, 45 and 46 of FIG. 2, there is stored in connection with each of the objects a particular face view of the object selected by the designer to present the most optimum view for the user to relate to. The present invention involves storing along with each of the objects a plurality of face views. Thus providing to the user the means for selecting the face view most appropriate to the user's needs.

Figure 3:
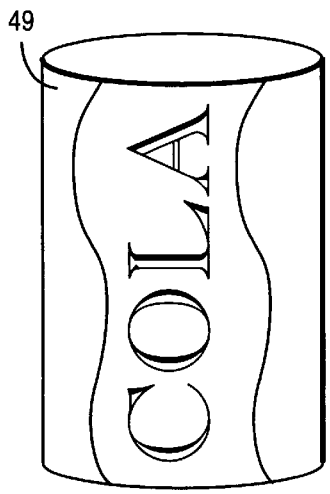
FIG. 3 is a representation of a face view of a selected object from the virtual reality workspace of FIGS. 2 with an associated pull-down menu.
Figure 2D:
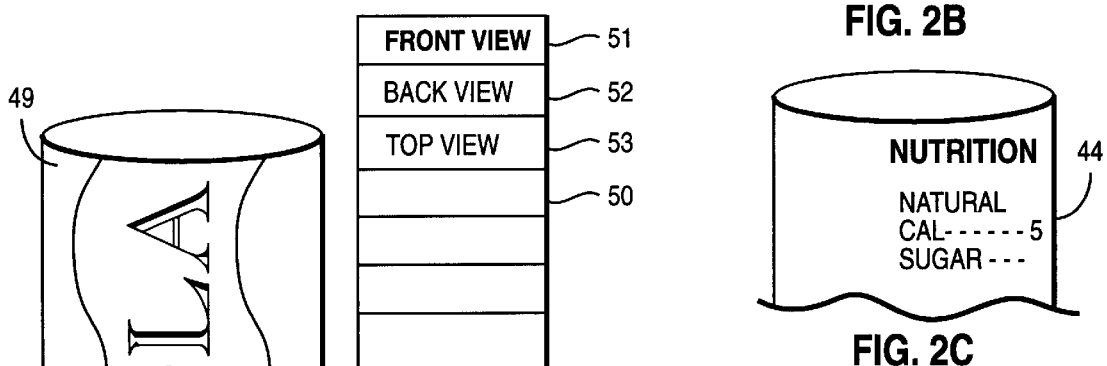

Let us assume that the user is navigating through the virtual reality workspace 42 and has stopped at viewpoint 47, FIG. 2. The user browses the shelves 43 of products and decides to consider the purchase of an item, let us say soda can 44. With a suitable pointing device such as cursor 48 or another visible indicator, controlled by mouse 26 of FIG. 1, the user points to an object, the soda cans 44 on shelves 43 of FIG. 2. The designer of the system has decided that if the user selects any product on the shelves, the user will be presented with a predetermined face view, which is the front portion or product design portion of the soda can and this is presented to the viewer as the predetermined front face view 49 in FIG. 3. Simultaneously, there is presented along side of the face view in FIG. 3 a pull-down type of menu 50 showing front view indicator 51 as the selected view followed by a list of alternative views including back view 52, top view 53. The front view 49, FIG. 3, is the designer selected predetermined view which presents a product package in full view to the user. The user has the additional option by cursoring down pull-down menu 50 to the back view in cases where nutritional information is on the back of the can or the top view so that the user may obtain price information, expiration date information or even information concerning the type of opener available on the can, i.e. snap open, tab open or fully closed.

Figure 2A:
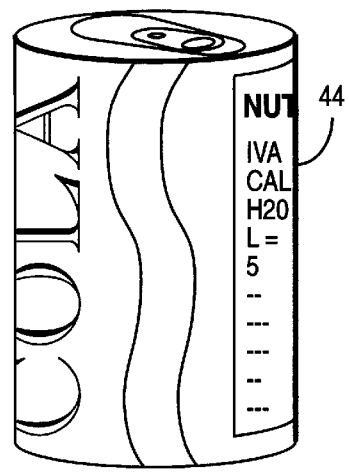
FIGS. 2A, 2B, 2C and 2D are several face views of a selected object in FIG. 2.
Figure 2B:
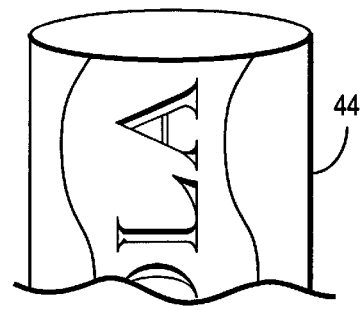
Figure 2C:
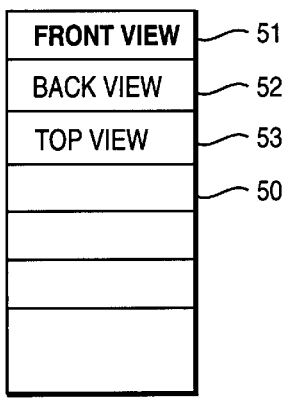

In accordance with another aspect of the present invention, instead of the view being selected by the user through the use of a pull-down menu as shown in FIG. 3, the user may select a view dependent upon the direction from which the user is pointing within the three-dimensional workspace, such as the workspace 42 of FIG. 2. Going back to FIG. 2, for example, if we consider pointer 48 as being vector-like, i.e. having a direction, we note that based upon the direction in which the faces of the soda cans 44 in stacks on shelves 43 are arranged relative to the direction of pointer 48. If pointer 48 is clicked on at the point shown, the front face of the soda can is shown in fragmented view in FIG. 2B will be the face view. On the other hand, if pointer 48 were pointing at the soda cans 44 from the complete opposite direction, i.e. rotated 180 degrees, pointer 48 would be pointing to the rear of the cans when clicked on and the rear of the can with nutritional information shown in fragmentary view in FIG. 2C would be the face view shown. On the other hand, if pointer 48 were facing the front of shelves 43 when it was clicked on with respect to soda cans 44 then the half or side view in which the soda cans are arranged in on the shelves as shown in FIG. 2A would be displayed. Finally, if pointer 48 were rotated so as to be pointing down at the tops of the cans when clicked on, then the top view shown in FIG. 2B would be the face view displayed. In this embodiment, the pointer 48 need not touch the cans. The virtual space around the cans could be arranged in spacial segments, then the position of the pointer cursor 48 in a particular spacial segment would be determinative of which view would be shown when the view selecting means would be clicked on.

As noted above, the multiple face views of the present invention may be stored together with their associated objects using the above-described object-oriented programming techniques involving object-oriented languages such as OpenGL, MRML or the above-described preferred VRT using the SCL programming language. In this manner, the multiple face views are permanently associated with their particular object so that even if the position of the object is substantially changed in the workspace, or even if the object itself is moved to a different virtual workspace environment, the predetermined face views will remain unchanged in association with the object. It should also be noted that while the above embodiment involves object-oriented programming to construct the object entities on the display, the objects with their associated face views may be implemented in more traditional languages such as "C" or "Basic".

Figure 4A:
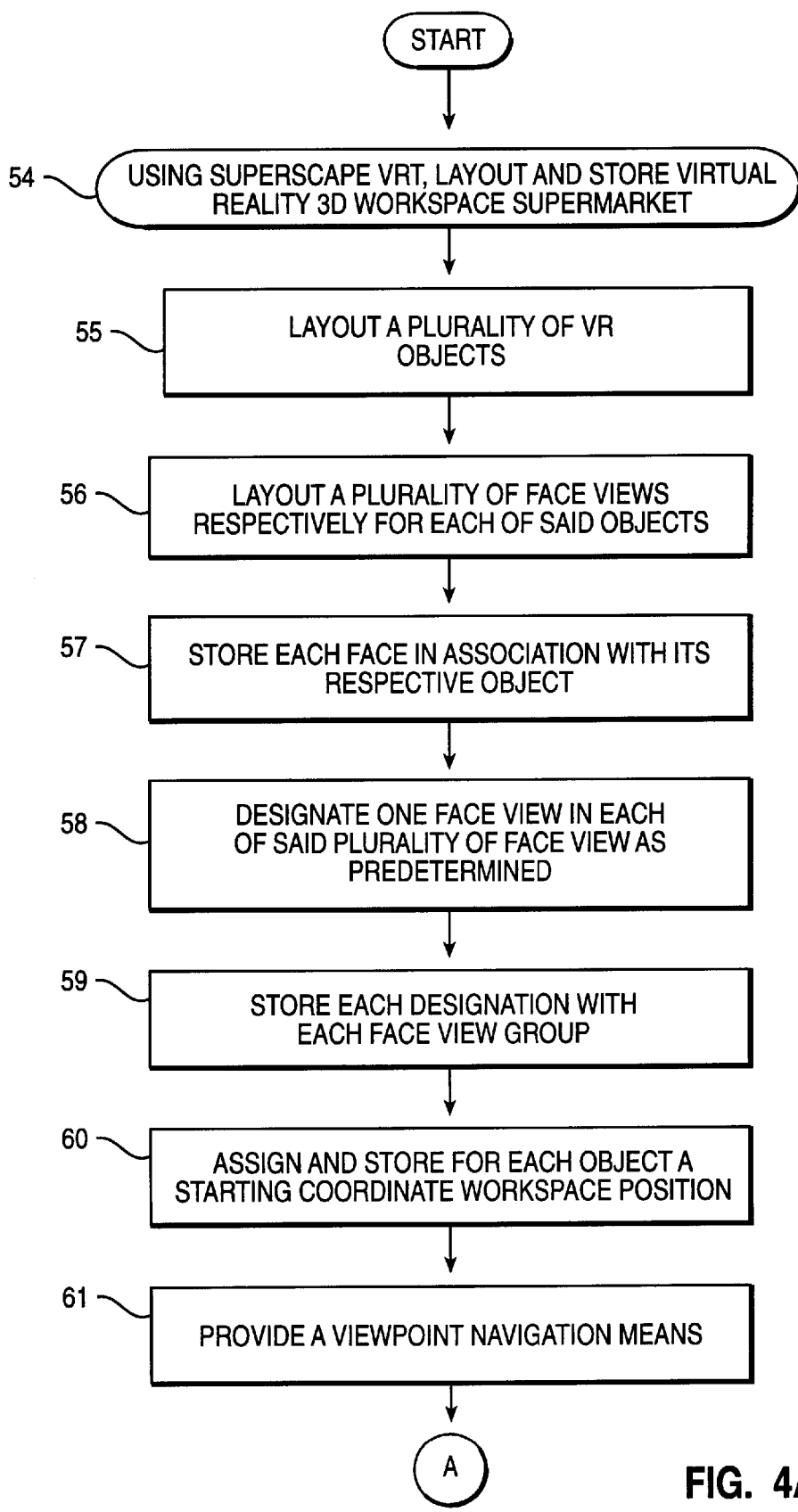
FIGS. 4A and 4B are flowcharts of the process implemented by the present invention for developing a virtual reality layout program in accordance with the present invention and for navigating through the virtual reality layout of the present invention.
Figure 4B:
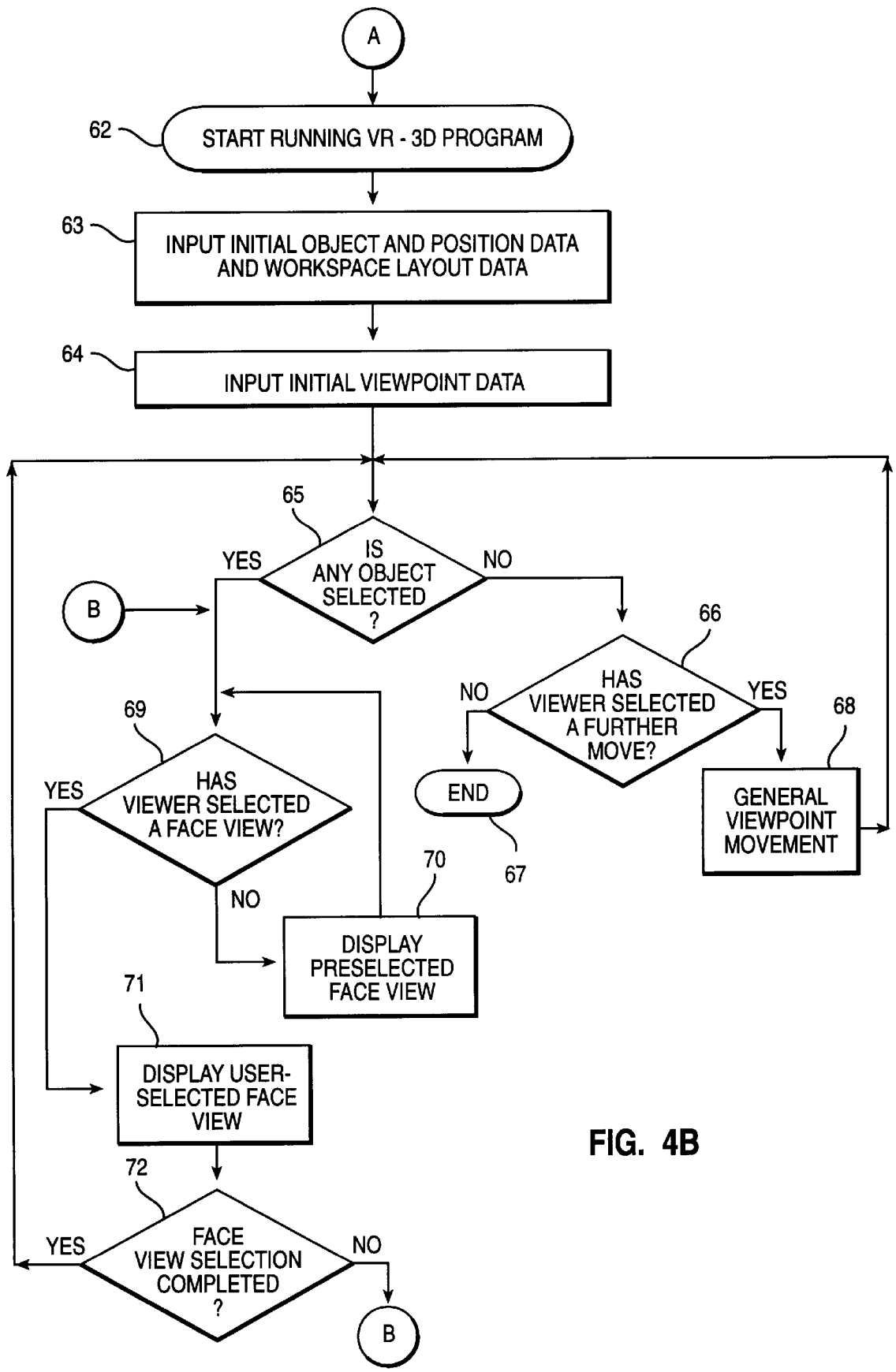

Now with reference to FIGS. 4A and 4B, we will describe a process implemented by the present invention in conjunction with the flowcharts of FIGS. 4A and 4B. The flowcharts are in two parts (FIGS. 4A and 4B). The steps in FIG. 4A relate to the development of the virtual reality landscape, objects, and their respective face views in accordance with the present invention using the previously described Superscape VRT object oriented programming toolkit.

First, step 54, FIG. 4A, the desired virtual reality three-dimensional workspace, for example, workspace 42, FIG. 2, is created and stored. Next, step 55, the virtual reality objects are laid out or created. These would be based upon stored representations of the objects in the landscape such as shelves 43 or various products 44, 45 and 46 shown in FIG. 2. Next, step 56, the programmer designs and lays out for each object, such as soda cans 44, a series of views. In the present example, these would be the front, back and top views of soda can 44 as referred to in FIG. 3 or the views of soda can 44 shown in FIGS. 2A, 2B, 2C and 2D. Next, step 57, in the case of each of the objects 44, 45 and 46, FIG. 2, the plurality of face views for that object are stored associated with it's respective object so that each object has several face views which may be selectively presented or selected by the viewer. Next, step 58, for each of the objects, the designing programmer designates a predetermined face view which will be presented to the viewer who has selected the object in the absence of the viewer interactive selection of an alternative face view. This preselection or designation of a particular face view is, step 59, also stored in association with the objects and the objects' respective group of face views. Next, step 60, the above-described program assigns and stores for each object a starting coordinate position in the above-described virtual reality workspace of FIG. 2. Then, step 61, a conventional means is provided for navigating the virtual reality workspace through a user viewpoint interface.

The process now proceeds to point A in FIG. 4B at which the created virtual reality workspace program is run, step 62. The program initially sets up the workspace layout on the display as well as the object layout and the relative positions of these objects in the workspace, step 63. Initial viewpoint data is also entered, step 64, and the following navigation steps ensue.

First, in decision block 65, the system determines whether the viewer has selected any object by conventional pointing means, such as mouse 26 in FIG. 1. If no object has been selected, the process flow then proceeds to decision block 66 where a determination is made as to whether the viewer has selected any further moves. If none has been selected, the viewer appears to be finished and the program may be ended, step 67. If the viewer has selected a further move of the viewpoint, then, step 68, further movement is generated by the program and the process is returned to block 65 where a determination is made as to whether any further object has been selected. Now, if turns out from decision block 65 that an object has been selected, then the process proceeds to decision block 69 where a determination is made as to whether the viewer has selected a particular face view. This selection of a face view by the viewer may be made, as previously described, either through the pull-down menu shown in FIG. 3 or by the direction of pointing by pointer 48 as described with respect to FIGS. 2A, 2B, 2C and 2D. If the viewer has not selected a face view, then the process proceeds to block 70 where the face view predetermined by the designer of the program, as previously described with respect to FIG. 4A, is the face view displayed, and the process returns to decision block 69 awaiting an interactive selection of a face view by the viewer or user. If, in decision block 69, the viewer does select a face view by one of the methods previously described, then the process proceeds to step 71 where the user selected face view is displayed. Next, at decision step 72, there is a continual monitoring to determine whether the viewer has completed selection of the chosen face view. This determination may be provided from the viewer through a suitable device such as the I/O mouse in FIG. 1. If the viewing of the face view is not completed, the system loops back to decision block 69. With respect to block 69 at this point, so long as the viewer continues the existing choice of face view, there will be no change and the system will loop through block 71 where the viewer's choice will be continued via a no output from decision block 72. On the other hand, the viewer may change the selected face view by making another selection, decision block 69, in which case the newly selected face view will be displayed, block 70, and the monitoring of the viewer's choice will continue via decision block 72. Upon the completion of the viewer's interest or viewing of the face views associated with a particular object, then decision block 72 will provide a yes output and the process will loop back to decision block 65 where a determination is made as previously described as to whether there is any further selection of another object by the viewer.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:

means for displaying a plurality of virtual three-dimensional objects within said workspace;

viewer interface means for navigating within said workspace by providing a moveable pointing means positionable at virtual angles with respect to said objects;

means for storing for each of a plurality of said virtual objects, a plurality of predetermined object face views, each face view respectively at a predetermined angle with respect to said object; and viewer interactive means for selecting and displaying one of said plurality of predetermined face views dependent upon said virtual angle of said pointing means.

2. The display system of claim 1 further including means for changing said predetermined angle for a face view and then storing the resultant face view.

3. The display system of claim 1 wherein said means for navigating provides an apparent moveable viewpoint interface positionable at virtual distances with respect to said objects and said face view angle is relative to said viewpoint.

4. The display system of claim 3 wherein said face views are displayed at predetermined apparent distances from the viewpoint as determined by the nature and content of the respective face views.

5. A computer implemented method for displaying a virtual three-dimensional workspace comprising:

displaying a plurality of virtual three-dimensional objects within said workspace;

navigating the viewer within said workspace by providing a moveable pointing means positionable at virtual angles with respect to said objects;

storing for each of a plurality of said virtual objects, a plurality of predetermined object face views, each face view respectively at a predetermined angle with respect to said object; and selecting and displaying one of said plurality of predetermined face views dependent upon said virtual angle of said pointing means.

6. The method of claim 1 wherein said navigating step is carried out by moving an apparent viewpoint interface to positions at virtual distances with respect to said objects; and said face view angle is relative to said interface.

7. The display method of claim 6 wherein said face views are displayed at predetermined apparent distances from the viewpoint as determined by the nature and content of the face views.

8. A computer program having data structures stored on a computer readable medium which provides a data processor supported display of a virtual three-dimensional workspace comprising:

means for displaying a plurality of virtual three-dimensional objects within said workspace;

viewer interface means for navigating within said workspace by providing a moveable pointing means positionable at virtual angles with respect to said objects;

means for storing for each of a plurality of said virtual objects, a plurality of predetermined object face views, each face view respectively at a predetermined angle with respect to said object; and viewer interactive means for selecting and displaying one of said plurality of predetermined face views dependent upon said virtual angle of said pointing means.

* * * * *